United States Patent Office 3,741,930
Patented June 26, 1973

3,741,930
DYE RETENTIVE OLEFIN POLYMER COMPOSITIONS CONTAINING A BASIC POLYAMIDE
Alberto Bonvicini and Giuseppe Cantatore, Terni, Italy, assignors to Montecatini Edison S.p.A., Milan, Italy
No Drawing. Filed July 15, 1970, Ser. No. 55,245
Claims priority, application Italy, July 16, 1969, 19,687/69
Int. Cl. C08f 29/12
U.S. Cl. 260—41 C    18 Claims

ABSTRACT OF THE DISCLOSURE

There are disclosed textile fibers, film, tape and shaped articles comprising olefinic polymers made up, prevailingly of isotactic macromolecules and which are exceptionally retentive of dyestuffs of the acid, metallized and plasto-soluble classes. The dyeing properties of the olefin polymers are improved by the addition of a basic polyamide obtained by reacting an acrylic or methacrylic ester with one or more polyamines.

THE PRIOR ART

Previously, our group disclosed that the ability of articles formed from or comprising polyolefins made up prevailingly of isotactic macromolecules to retain dyestuffs can be increased by mixing the polyolefins, prior to forming the same into shaped articles, with condensation resins containing the group —NHCO—.

Said resins, preferably having a low degree of condensation, are obtained by the auto-condensation of cyclic amides, such as epsilon caprolactam (polyamides); by the reaction of diisocyanates with higher glycols (polyurethanes); or by the reaction of diisocyanates with diamines (polyureas).

Modification of the dyeing properties of polypropylene by the addition thereto of basic polyamides obtained by the poly-condensation of an N,N'-bis(ω-carboalcohoxyalkyl) piperazine with a diamine, has also been disclosed by our group.

THE PRESENT INVENTION

One object of this invention was to provide textile fibers and other manufactured shaped articles comprising polyolefins made up prevailingly of isotactic macromolecules, and more specifically polypropylene consisting essentially of isotactic polypropylene, which are characterized by exceptional retentivity for dyestuffs of the acid, metallized and plasto-soluble classes.

This and other objects are accomplished in accordance with the invention by mixing with the polyolefin, prior to extruding or otherwise shaping the same, from 1 to 25% by weight of a basic polyamide which is solid and made up of monomeric units of the formula:

—OC—CHY—CH$_2$—RN—X—RN— wherein Y represents a hydrogen atom or a lower alkyl radical; the R's each independently represent a hydrogen atom or an alkyl, aryl or cycloalkyl radical, or may be an alkylene radical which together with X, forms a piperazine ring; and X represents a bivalent aliphatic, cycloaliphatic, or aromatic radical which may contain nitrogen atoms in the form of secondary or tertiary amino groups or heteroatoms such as O, S and P and which together with R may form a piperazine ring when R is an alkylene radical.

The polyolefins used are normally crystalline polymers of monomers having the formula CH$_2$=CHR in which R is hydrogen or an alkyl or aryl group, and include polyethylene, polypropylene, polybutene-1, polypentene-1, polyhexene-1, poly-4-methylpentene-1, polyoctene-1 and polystyrene, as well as crystalline copolymers of ethylene and the higher alpha-olefins.

Such polyamides are obtained by reacting an ester of acrylic or methacrylic acid selected from methyl acrylate, ethylacrylate, butylacrylate, methyl methacrylate and the like, with one or more polyamines selected from the group having the general formula:

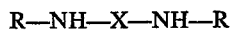

R—NH—X—NH—R wherein the R's and X have the same meaning as stated above.

As examples of such polyamines there may be mentioned ethylene diamine, hexamethylene diamine, diethylene triamine, tetraethylene pentamine, piperazine, N-(2-aminoethyl) piperazine, N,N'-dibutylhexamethylene diamine, and the like.

The reaction is performed by heating a mixture of the acrylic or methacrylic ester with at least one of the polyamines at temperatures ranging from room temperature at 120° C. for 1 to 3 hours, preferably in an inert gas atmosphere, and then completing the polycondensation by heating the reacting mixture at temperatures from 120° to 300° C., with removal under vacuum of the alcohol formed. The preferred molar ratio between the acrylic ester and the polyamine (or total polyamines) in the reaction is 1:1, but an excess up to 30% of one of the reactants (preferably the polyamine) can be used.

In a preferred embodiment, the polyolefin is normally crystalline polypropylene consisting prevailingly of isotactic macromolecules and obtained by polymerizing propylene in contact with catalysts capable of polymerizing the monomer by a stereospecific mechanism, or a crystalline copolymer of propylene and ethylene in which polymerized units of propylene predominate.

The mixture of polyolefin and basic polyamide is generally obtained by simple mixing of the two ingredients in powder form.

However, the mixture to be extruded or otherwise shaped can be obtained by other methods, as by mixing the polyolefin with a solution of the basic polyamide in a suitable solvent, followed by evaporation of the solvent, or by adding the basic polyamide to the polymerization zone in which the polyolefin is produced, either during or at the end of the polymerization reaction.

It is also possible to mix the reagents which react to form the basic polyamide with the polyolefin, and induce the polycondensation which results in the basic polyamide during the thermal treatment to which the polyolefin is subjected incidental to pelletizing and spinning operations.

For preparing yarns, the mixtures are pelletized and then extruded through suitable melt-spinning devices, in the absence of oxygen and, preferably, in an atmosphere of inert gas, e.g., nitrogen.

Other adjuvants may be mixed with the polyolefin and basic polyamine during the mixing operation. The adjuvants used are opacifiers, pigments, organic or inorganic fillers, stabilizers, lubricants, dispersing agents, and the like.

After spinning, the yarn can be stretched, for example with a stretch ratio of 1:2 to 1:20, at a temperature of from 80 to 150° C., using a stretching device heated by means of hot air, steam, or similar fluid, or provided with a heating plate. The yarn can be highly oriented, after extrusion, by methods described previously by our group.

The yarn can be dimensionally stabilized by heating it at 80° C. to 160° C. in a free-to-shrink condition or under conditions of controlled shrinkage.

Conventional dies can be used in spinning the yarn. Preferably, the dies have a diameter greater than 0.5 mm. and a length/diameter ratio higher than 1.1, preferably from 10 to 30.

The holes of the die may be circular or non-circular, in transverse section.

The dyeable composition comprising the polyolefin and basic polyamide may constitute a part of a conjugated fiber, and the core, or the sheath, of composite core-and-sheath fibers.

The mixture of polyolefin and basic polyamide can be spun into either monofilaments or into multifilament yarns and used for preparing cotton system or staple fibers, bulk or staple fiber yarns, and spun-bonded and non-woven fabrics in general. If desired, or necessary, the monofilaments or multifilament yarns can be treated with reagents which render the basic polyamides present therein completely insoluble in water. Particularly suitable for such treatments are mono- and diepoxy compounds, mono- and diisocyanates, mono- and dialdehydes, halogens, divinyl benzene, and the like. The treatment with the agents mentioned can be performed either before or after the articles are stretched.

The mixtures of polyolefin and basic polyamide can be used for preparing film, tapes, and shaped objects generally.

Fibers formed from the polyolefin/polyamide mixtures of the invention exhibit notable retention of dyestuffs belonging to the acid, premetallized, and plasto-soluble classes. The dyed fibers have good fastness, especially to light.

The fibers, and other articles, can be subjected to an acid treatment which improves the dyeability, and the fastness of the dyes.

In addition to improving the dyeing capacity of polyolefins, the basic polyamides are also useful dyeing modifiers for other types of polymers, such as acrylic and vinyl polymers, polyesters, polyamides (e.g., nylon) and the like, and may be mixed with such polymers prior to extrusion thereof.

Fibers comprising or formed from polypropylene consisting essentially of isotactic polypropylene (as disclosed and claimed in Natta et al. U.S. Pat. 3,112,300) and a basic polyamide as described herein have been dyed successfully by immersing the fibers for one and a half hours in a boiling dyebath containing 2.5% by weight, based on the fiber weight, of a dyestuff belonging to either the acid, premetallized, or plasto-soluble classes, using a fiber/dyebath ratio of 1:40.

The dyebaths containing an acid or premetallized dyestuff also contained 1% by weight, on the fiber weight, of a surfactant consisting of the condensation product of ethylene oxide and an alkyl phenol, or of the sodium salt of n-oleyl-n-methylthaurine. Thirty minutes after the bath boiled, a 2% (by weight on the fiber weight) solution of 20% acetic acid was added to the bath to improve the bath exhaustion.

The dyebaths containing a plasto-soluble dye also contained 2% of surfactant and 3% of ammonium acetate, by weight based on the fiber weight.

After dyeing, the articles are rinsed with running water and found to be dyed to deep level shades. The fastness of the dyes to light, washing and rubbing are fully satisfactory.

The following examples are given to illustrate the invention, and are not intended to be limiting.

EXAMPLE 1

129 g. (1 mole) of N-(2-aminoethyl) piperazine and 86 g. (1 mole) of methyl acrylate are heated under stirring and in nitrogen atmosphere at 100° C. for 2 hours. The mixture is then further heated at 120° C. for 2 hours, at 150° C. for 1 hour and at 180° C. for 1 hour, with removal of the methanol which forms in the reaction, whereupon it is subjected to a final heating at 180° C. under vacuum. The basic polyamide thus obtained has inherent viscosity (measured on a 0.5% chloroform solution) of 0.19, and melting point comprised between 180° and 210° C.; its titratable nitrogen content is found to be=15.1% (calculated 15.2%).

50 g. of said polyamide are mixed with 950 g. of the polypropylene consisting essentially of isotactic macromolecules (melt index=24.7, ash=0.008%, residue on heptane extraction=97.1%).

The mixture is extruded at 220° C. and the granules obtained are converted to fibers under the following conditions:

Spinning:
    Warm-screw temperature _____ 230° C.
    Temperature of the extruding head _____ 235° C.
    Die temperature _____ 230° C.
    Die _____ 60 holes having diameter of 0.8 mm., length 16 mm.
    Maximum pressure ___ 50 kg./cm.$^2$.
    Windup speed _____ 400 meters/minute.
Stretching:
    Temperature _____ 130° C.
    Medium _____ Steam.
    Stretch ratio _____ 1:5.

The fibers obtained exhibit good affinity for the following dyestuffs:

Red for wool B _____ (C.I. acid red 115).
Alizarine blue SE _____ (C.I. acid blue 43).
Lanasyn red 2GL _____ (C.I. acid red 216).
Lanasyn brown 3RL _____ (C.I. acid brown 30).

The dyed fibers show good fastness to light, washing and rubbing.

EXAMPLE 2

129 g. (1 mole) of N-(2-aminoethyl)piperazine is added a little at a time, over 30 minutes, to 86 g. (1 mole) of methyl acrylate, under agitation and in a stream of nitrogen, cooling with running water in such a way as not to exceed 30° C.

The product thus obtained (a clear-colored semi-solid) is made up prevalently of the polycondensation product of acrylic ester and amine. 50 g. of this product are mixed with 950 g. of polypropylene (melt index=24.7, ash=0.008%, residue on heptane extraction=97.1%).

The mixture is extruded at 220° C., removing under vacuum the methanol which forms in the polycondensation reaction between N-(2-amino-ethyl)piperazine and methyl acrylate. The granules thus obtained are converted to fibers under the following conditions:

Spinning:
    Warm-screw temperature _____ 240° C.
    Temperature of the extruding head _____ 240° C.
    Die temperature _____ 245° C.
    Die _____ 60 holes, having diameter of 0.8 mm., length 16 mm.
    Maximum pressure ___ 50 kg./cm.$^2$.
    Windup speed _____ 400 meters/minute
Stretch:
    Temperature: _____ 130° C.
    Medium _____ Steam.
    Stretch ratio _____ 1:5.

The fibers obtained show good affinity for the dyestuffs listed in Example 1. The dyed fibers proved to be fast to light, washing and rubbing.

EXAMPLE 3

60 g. (1 mole) of ethylene diamine and 86 g. (1 mole) of methyl acrylate are heated under stirring and in a nitrogen atmosphere at 100° C. for 3 hours. The temperature is then raised to 115° C. during 1 hour, and the mixture is made to react at this temperature for one additional hour, with removal under vacuum of the methanol formed, whereupon it is definitively heated at 180° C. for 2 hours. A polyamide is thus obtained having inherent viscosity (measured on a 0.5% chloroform solution) of 0.1 and melting point of 60° C.; its titratable nitrogen content is found to be=12.15% (calculated=12.3%).

50 g. of said polyamide are mixed with 950 g. of polypropylene (melt index=24.7, ash=0.008%, residue on heptane extraction=97.1%).

The mixture is extruded at 220° C. and the granules obtained are converted to fibers in the following conditions:

Spinning:
    Warm-screw temperature _____ 230° C.
    Temperature of the extruding head _____ 240° C.
    Die temperature _____ 240° C.
    Die _____ 60 holes, having diameter of 0.8 mm., length 16 mm.
    Maximum pressure ___ 50 kg./cm.$^2$.
    Windup speed _____ 400 meters/minute.

Stretch:
    Temperature _____ 130° C.
    Medium _____ Steam.
    Stretch ratio _____ 1:5.

The fibers obtained show good affinity for the dyestuffs listed in Example 1. The dyed fibers are fast to light, washing and rubbing.

EXAMPLE 4

129 g. (1 mole) of N-(2-aminoethyl) piperazine and 100 g. (1 mole) of ethylacrylate are heated under stirring and in a nitrogen atmosphere at 100° C. for 2 hours. The temperature is then allowed to increase to 120° C. during 1 hour, and the mixture is kept at this temperature for one additional hour, with removal under vacuum of the ethanol formed, whereupon it is definitively heated at 180° C. for 2 hours, under vacuum. A basic polyamide is thus obtained having melting point comprised between 180° C. and 205° C.

50 g. of this polyamide are mixed with 950 g. of polypropylene (melt index=24.7, ash=0.008%, residue on heptane extraction=97.1%).

The mixture is extruded at 220° C. and the granules obtained are converted to fibers under the following conditions:

Spinning:
    Warm-screw temperature _____ 230° C.
    Temperature of the extruding head _____ 235° C.
    Die temperature _____ 235° C.
    Die _____ 60 holes having diameter of 0.8 mm., length 16 mm.
    Maximum pressure ___ 51 kg./cm.$^2$.
    Windup speed _____ 400 meters/minute.

Stretch:
    Temperature: _____ 130° C.
    Medium _____ Steam.
    Stretch ratio _____ 1:5.

The fibers obtained show good affinity for the dyestuffs listed in Example 1. The dyed fibers are fast to light, washing and rubbing.

EXAMPLE 5

116 g. (1 mole) of hexamethylene diamine, 60 g. (1 mole) of ethylene diamine and 172 g. (2 moles) of methyl acrylate are heated under stirring and in a nitrogen atmosphere at 100° C. for 2 hours. The temperature is then allowed to increase to 120° C. and the mixture is kept at this temperature for 1 hour, with removal under vacuum of the methanol formed, whereupon it is definitively heated at 180° C. for 2 hours. The basic polyamide thus obtained has inherent viscosity (measured on a 0.5% chlorofrom solution) of 0.11.

50 g. of this polyamide are mixed with 950 g. of polypropylene (melt index=24.7, ash=0.008%, residue on heptane extraction=97.1%).

The mixture is extruded at 220° C. and the granules obtained are converted to fibers under the following conditions.

Spinning:
    Warm-screw temperature _____ 240° C.
    Temperature of extruding head _____ 240° C.
    Die temperature _____ 245° C.
    Die _____ 60 holes having diameter of 0.8 mm., length 16 mm.
    Maximum pressure ___ 50 kg./cm.$^2$.
    Windup speed _____ 400 meters/minute.

Stretch:
    Temperature _____ 130° C.
    Medium _____ Steam.
    Stretch ratio _____ 1:5.

The fibers show good retention for the dyestuffs listed in Example 1. The dyed fibers are fast to light, washing and rubbing.

EXAMPLE 6

187 g. (1 mole) of tetraethylenepentamine and 86 g. (1 mole) of methyl acrylate are heated under stirring and in a nitrogen atmosphere at 100° C. for 1.5 hours. The temperature is then allowed to rise to 120° C. and the mixture is reacted at this temperature for 2 hours, with removal under vacuum, during the last hour, of the methanol formed, whereupon it is definitively heated under vacuum at 180° C. for 2 hours. A basic polyamide is thus obtained; its titratable nitrogen content is found to be=22.85% (calculated 23.0%).

50 g. of this polyamide are mixed with 950 g. of polypropylene (melt index=24.7, ash=0.008%, residue on heptane extraction=97.1%).

The mixture is extruded at 220° C. and the granules obtained are converted to fibers using the following conditions:

Spinning:
    Warm-screw temperature _____ 235° C.
    Temperature of extruding head _____ 240° C.
    Die temperature _____ 240° C.
    Die _____ 60 holes having diameter of 0.8 mm., length 16 mm.
    Maximum pressure ___ 52 kg./cm.$^2$.
    Windup speed _____ 400 meters/minute.

Stretch:
    Temperature _____ 130° C.
    Medium _____ Steam.
    Stretch ratio _____ 1:5

The fibers obtained show good retention for the dyestuffs listed in Example 1, and the fibers after dyeing, are fast to light, washing and rubbing.

EXAMPLE 7

Using the procedure disclosed in Example 6, but starting from a mixture formed by 103 g. (1 mole) of diethylene triamine and 86 g. (1 mole) of methyl acrylate, a basic polyamide is obtained; its titratable nitrogen content is found to be 17.7% (calculated 17.8%).

40 g. of this polyamide are mixed with 960 g. of polypropylene having a melt index of 24.7, ash=0.008% and residue on heptane extraction=97.1%.

The mixture is extruded at 210° C. and the granules obtained are converted to fibers under the following conditions:

Spinning:
 Warm-screw temperature _____ 230° C.
 Temperature of extruding head _____ 235° C.
 Die temperature _____ 240° C.
 Die _____ 60 holes having diameter of 0.8 mm., length 16 mm.
 Maximum pressure ___ 50 kg./cm.$^2$.
 Windup speed _____ 400 meters/minute.
Stretch:
 Temperature _____ 130° C.
 Medium _____ Steam.
 Stretch ratio _____ 1:5.

The fibers obtained show good retention for the dyestuffs listed in Example 1, and the dyed fibers are fast to light, washing and rubbing.

EXAMPLE 8

Using the procedure disclosed in Example 6, but starting from a mixture formed by 139.2 g. (1.2 moles) of hexamethylene diamine and 86 g. (1 mole) of methylacrylate and completing the polycondensation by heating for 2 hours at 150° C., instead of 180° C., a basic polyamide is prepared having melting point comprised between 50° and 60° C., and inherent viscosity (measured on a 0.5% isopropyl solution) of 0.12; its titratable nitrogen content is found to be 8.1% (calculated 8.2%).

50 g. of this polyamide are mixed with 950 g. of polypropylene having a melt index=24.7, ash=0.008% and residue on heptane extraction=97.1%.

The mixture is extruded at 220° C. and the granules obtained are converted to fibers under the following conditions:

Spinning:
 Warm-screw temperature _____ 235° C.
 Temperature of extruding head _____ 240° C.
 Die temperature _____ 240° C.
 Die _____ 60 holes having diameter of 0.8 mm., length 16 mm.
 Maximum pressure ___ 50 kg./cm.$^2$.
 Windup speed _____ 400 meters/minute.
Stretch:
 Temperature _____ 130° C.
 Medium _____ Steam.
 Stretch ratio _____ 1:5.

The fibers obtained show good retention for the dyestuffs listed in Example 1. The dyed fibers are fast to light, washing and rubbing.

EXAMPLE 9

Using the procedure disclosed in Example 6, but starting from a mixture formed by 116 g. (1 mole) of hexamethylene diamine, 103 g. (1 mole) of diethylene triamine and 172 g. (2 moles) of methylacrylate, and completing the reaction by heating for 2 hours at 150° C., instead of 180° C., a basic polyamide is obtained; its titratable nitrogen content is found to be 12.7% (calculated 12.8%).

50 g. of this polyamide are mixed with 950 g. of polypropylene having a melt index=24.7, ash=0.008% and residue on heptane extraction=97.1%.

The mixture is extruded at 210° C. and the granules obtained are converted to fibers under conditions as follows:

Spinning:
 Warm-screw temperature _____ 235° C.
 Temperature of extruding head _____ 240° C.
 Die temperature _____ 240° C.
 Die _____ 60 holes having diameter of 0.8 mm., length 16 mm.
 Maximum pressure ___ 51 kg./cm.$^2$.
 Windup speed _____ 400 meters/minute.
Stretch:
 Temperature _____ 130° C.
 Medium _____ Steam.
 Stretch ratio _____ 1:5.

The fibers obtained show good retention for the dyestuffs listed in Example 1, and after the dyeing, are fast to light, washing and rubbing.

EXAMPLE 10

116 g. (1 mole) of hexamethylene diamine, 129 g. (1 mole) of N-(2-amino-ethyl) piperazine and 172 g. (2 moles) of methyl acrylate are heated under stirring and in a nitrogen atmosphere at 100° C. for 2 hours. The mixture is then heated at 120° C. for 1 hour and subsequently at 180° C. for 2 hours, with removal under vacuum of the methanol formed.

A basic polyamide is obtained, having inherent viscosity (measured on a 0.5% isopropyl alcohol solution) of 0.2; its titratable nitrogen content is found to be 11.7% (calculated 11.9%).

50 g. of this polyamide are mixed with 950 g. of polypropylene having a melt index=24.7, ash=0.008% and residue to heptane extraction=97.1%.

The mixture is extruded at 220° C. and the granules obtained are converted to fibers under the following conditions:

Spinning:
 Warm-screw temperature _____ 235° C.
 Temperature of extruding head _____ 240° C.
 Die temperature _____ 240° C.
 Die _____ 60 holes having diameter of 0.8 mm., length 16 mm.
 Maximum pressure ___ 51 kg./cm.$^2$.
 Windup speed _____ 400 meters/minute.
Stretch:
 Temperature _____ 130° C.
 Medium _____ Steam.
 Stretch ratio _____ 1:5.

The fibers obtained show good retention for the dyestuffs listed in Example 1. The dyed fibers are fast to light, washing and rubbing.

EXAMPLE 11

Using the procedure disclosed in Example 10, but starting from a mixture comprising 60 g. (1 mole) of ethylene diamine, 129 g. (1 mole) of N-(2-aminoethyl)piperazine and 172 g. (2 moles) of methyl acrylate, and completing the reaction by heating at 180° C. for 3 hours, instead of 2 hours, a basic polyamide is prepared having melting point comprised between 50° and 60° C. and inherent viscosity (measured on a 0.5% isopropylic alcohol solution) of 0.1; its titratable nitrogen content is found to be 14% (calculated 14.1%).

40 g. of this polyamide are mixed with 960 g. of polypropylene having a melt index of 24.7, ash=0.008% and residue on heptane extraction=97.1%. The mixture is extruded at 220° C. and the granules obtained are converted to fibers under the following conditions:

Spinning:
- Warm-screw temperature _____ 235° C.
- Temperature of extruding head _____ 235° C.
- Die temperature _____ 235° C.
- Die _____ 60 holes having diameter of 0.8 mm., length 16 mm.
- Maximum pressure ___ 50 kg./cm.$^2$.
- Windup speed _____ 400 meters/minute.

Stretch:
- Temperature _____ 130° C.
- Medium _____ Steam.
- Stretch ratio _____ 1:5.

The fibers obtained show good retention for the dyestuffs listed in Example 1. The dyed fibers are fast to light, washing and rubbing.

EXAMPLE 12

Using the procedure disclosed in Example 11, but starting from 103 g. (1 mole) of diethylene triamine, 129 g. (1 mole) of N-(2-aminoethyl) piperazine and 172 g. (2 moles) of methyl acrylate, a basic polyamide is prepared having inherent viscosity (measured on a 0.5% isopropyl alcohol solution) of 0.08; its titratable nitrogen content is found to be 16.2% (calculated 16.4%).

40 g. of this polyamide are mixed with 960 g. of polypropylene having a melt index=24.7, ash=0.008% and residue on heptane extraction=97.1%.

The mixture is extruded at 220° C. and the granules obtained are converted to fibers under the following conditions:

Spinning:
- Warm-screw temperature _____ 235° C.
- Temperature of extruding head _____ 240° C.
- Die temperature _____ 240° C.
- Die _____ 60 holes having diameter of 0.8 mm., length 16 mm.
- Maximum pressure ___ 50 kg./cm.$^2$.
- Windup speed _____ 400 meters/minute.

Stretch:
- Temperature _____ 130° C.
- Medium _____ Steam.
- Stretch ratio _____ 1:5.

The fibers obtained show good retention for the dyestuffs listed in Example 1. The dyed fibers are fast to light, washing and rubbing.

EXAMPLE 13

60 g. (1 mole) of ethylene diamine, 103 g. (1 mole) of diethylene triamine and 172 g. (2 moles) of methyl acrylate are heated under stirring and in a nitrogen atmospheer at 100° C. for 1 hour. The mixture is then heated to 120° C. for 1 hour and subsequently at 180° C. for a further 2 hours, with removal under vacuum, during the last hour, of the methanol formed. A basic polyamide is thus obtained; its titratable nitrogen content is found to be 15.3% (calculated 15.5%).

50 g. of this polyamide are mixed with 950 g. of polypropylene having a melt index=24.7, ash=0.008% and residue on heptane extraction=97.1%.

The mixture is extruded at 220° C. and the granules obtained are converted to fibers under the following conditions:

Spinning:
- Warm-screw temperature _____ 240° C.
- Temperature of extruding head _____ 240° C.
- Die temperature _____ 245° C.
- Die _____ 60 holes having diameter of 0.8 mm., length 16 mm.
- Maximum pressure ___ 50 kg./cm.$^2$.
- Windup speed _____ 400 meters/minute.

Stretch:
- Temperature _____ 130° C.
- Medium _____ Steam.
- Stretch ratio _____ 1:5.

The fibers obtained show good retention for the dyestuffs listed in Example 1. The dyed fibers are fast to light, washing and rubbing.

EXAMPLE 14

Using the procedure disclosed in Example 1, but starting from 86 g. (1 mole) of piperazine and 86 g. (1 mole) of methyl acrylate, a basic polyamide is prepared having melting point comprised between 150° and 170° C.; its titratable nitrogen content is found to be 9.8% (calculated 10.0%).

50 g. of this polyamide are mixed with 950 g. of polypropylene having a melt index=24.7, ash=0.008% and residue on heptane extraction=97.1%.

The mixture is extruded at 210° C. and the granules obtained are converted to fibers under the following conditions:

Spinning:
- Warm-screw temperature _____ 235° C.
- Temperature of extruding head _____ 240° C.
- Die temperature _____ 240° C.
- Die _____ 60 holes having diameter of 0.8 mm., length 16 mm.
- Maximum pressure ___ 50 kg./cm.$^2$.
- Windup speed _____ 400 meters/minute.

Stretch:
- Temperature _____ 130° C.
- Medium _____ Steam.
- Stretch ratio _____ 1:5.

The fibers obtained show good affinity for the dyestuffs listed in Example 1. The dyed fibers are fast towards light, washing and rubbing.

EXAMPLE 15

Using the procedure disclosed in Example 1, but starting from 28 g. (1 mole) of N,N'-dibutylhexamethylene diamine, 129 g. (1 mole) of N-(2-aminoethyl)piperazine and 172 g. (2 moles) of methyl acrylate, a basic polyamide is prepared; its titratable nitrogen content is found to be 8.9% (calculated 9.4%).

50 g. of this polyamide are mixed with 950 g. of polypropylene having a melt index=24.7, ash=0.008% and residue on heptane extraction=97.1%.

The mixture is extruded at 220° C. and the granules obtained are converted to fibers under the following conditions:

Spinning:
- Warm-screw temperature _____ 235° C.
- Temperature of extruding head _____ 240° C.
- Die temperature _____ 240° C.
- Die _____ 60 holes having diameter of 0.8 mm., length 16 mm.
- Maximum pressure ___ 50 kg./cm.$^2$.
- Windup speed _____ 400 meters/minute.

Stretch:
- Temperature _____ 130° C.
- Medium _____ Steam.
- Stretch ratio _____ 1:5.

The fibers obtained show good affinity for the dyestuffs listed in Example 1. The dyed fibers are fast to light, washing and rubbing.

EXAMPLE 16

103 g. (1 mole) of diethylene triamine and 100 g. (1 mole) of methylmethacrylate are reacted, and 40 g. of the basic polyamide thus obtained are mixed with 960 g. of polypropylene having a melt index=24.7, ash=0.008% and residue on heptane extraction=97.1%.

The mixture is extruded at 220° C. and the granules obtained are converted into fibers in the following conditions:

Spinning:
- Warm-screw temperature _____ 235° C.
- Temperature of extruding head __ 240° C.
- Die temperature _____ 240° C.
- Die _____ 60 holes having diameter of 0.8 mm., length 16 mm.
- Maximum pressure _____ 50 kg./cm.².
- Windup speed _____ 400 meters/minute.

Stretch:
- Temperature _____ 130° C.
- Medium _____ Steam.
- Stretch ratio _____ 1:5.

The fibres obtained show good affinity for the dyestuffs listed in Example 1. The dyed fibres are fast to light, washing and rubbing.

Polypropylene consisting essentially of isotactic polypropylene is described and claimed in Natta et al. U.S. Pat. 3,112,300. Isotactic macromolecules are macromolecules having substantially the isotactic stereoregular structure. Isotactic polymers are polymers made up of isotactic macromolecules. In the polymers made up prevailingly of isotactic macromolecules as referred to herein, the isotactic macromolecules are present in an amount over 50%.

As will be apparent, changes in detail may be made in practicing the invention without departing from its spirit. We intend to include, in the scope of the appended claims, all modifications and variations which will be obvious to those skilled in the art.

We claim:

1. Manufactured shaped articles, including textile fibers, films and tapes, characterized by high retentivity for dyestuffs of the acid, metallized and plasto-soluble classes, and shaped from a composition consisting essentially of a crystalline polyolefin and from 1% to 25% by weight of at least one normally solid basic polyamide made up of units having the formula —OC—CHY—CH₂—RN—X—NR—
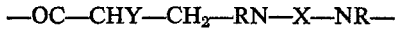

wherein Y represents hydrogen or a lower alkyl radical; the R's each independently represent hydrogen, an alkyl, aryl or cycloalkyl radical, or an alkylene radical which together with X forms a piperazine ring, and X represents a bivalent aliphatic, cycloaliphatic or aromatic radical which may contain nitrogen atoms in the form of secondary or tertiary amino groups or heteroatoms such as O, S, and P, and which together with R may form a piperazine ring when R is an alkylene radical.

2. Manufactured articles according to claim 1, and shaped from a composition containing the basic polyamide in an amount of from 2% to 10% by weight.

3. Manufactured articles according to claim 1 and shaped from a composition in which the crystalline polyolefin is polypropylene made up prevailingly of isotactic macromolecules.

4. Manufactured articles according to claim 1 and shaped from a composition in which the crystalline polyolefin is polypropylene consisting essentially of isotactic macromolecules.

5. Manufactured articles according to claim 1, and shaped from a composition in which the crystalline polyolefin is a copolymer of ethylene and propylene in which polymerized units of propylene predominate.

6. Manufactured articles according to claim 1, and shaped from a composition containing from 1% to 25% by weight of a basic polyamide obtained by reacting N-(2-aminoethyl)piperazine with methyl acrylate.

7. Dyeable compositions consisting essentially of a crystalline polyolefin and from 1% to 25% by weight of a normally solid basic polyamide made up of units of the general formula:

—OC—CHY—CH₂—NR—X—NR—

in which Y represents hydrogen or a lower alkyl radical, the R's each independently represent hydrogen, an alkyl, aryl or cycloalkyl radical or an alkylene radical which together with X forms a piperazine ring, and X represents a bivalent aliphatic, cycloaliphatic or aromatic radical which may contain nitrogen atoms in the form of secondary or tertiary amino groups or heteroatoms such as O, S and P and which, together with R, may form a piperazine ring when R is an alkylene radical.

8. Dyeable compositions according to claim 7, characterized in containing from 2% to 10% by weight of the basic polyamide.

9. Dyeable compositions according to claim 7, in which the crystalline polyolefin is polypropylene made up prevailingly of isotactic macromolecules.

10. Dyeable compositions according to claim 7, in which the crystalline polyolefin is a copolymer of ethylene and propylene in which the propylene predominates.

11. Dyeable compositions according to claim 7, in which the basic polyamide is a product obtained by reacting N-(2-aminoethyl) piperazine with methyl acrylate.

12. Manufactured shaped articles of a composition consisting essentially of a crystalline polyolefin and from 1% to 25% by weight of at least one normally solid basic polyamide made up of units having the formula —OC—CHY—CH₂—RN—X—NR

wherein R represents hydrogen or a lower alkyl radical, the R's each independently represent hydrogen, an alkyl, aryl or cycloalkyl radical, or an alkylene radical which together with X forms a piperazine ring, and X represents a bivalent aliphatic, cycloaliphatic or aromatic radical which may contain nitrogen atoms in the form of secondary or tertiary amino groups or heteroatoms such as O, S and P, and which, together with R, may form a piperazine ring when R is an alkylene radical, said articles being dyed with a dyestuff selected from the group consisting of the acid, metallized and plasto-soluble dyes.

13. Dyed manufactured shaped articles according to claim 12, and formed of a composition the basic polyamide of which is obtained by reacting at least one polyamide with an ester selected from the group consisting of acrylic and methacrylic esters.

14. Dyed manufactured articles according to claim 12, and formed of a composition the crystalline polyolefin of which is polypropylene made up prevailingly of isotactic macromolecules.

15. Dyed manufactured articles according to claim 12, and formed of a composition the crystalline polyolefin of which is polypropylene consisting essentially of isotactic macromolecules.

16. Dyed manufactured articles according to claim 12, and formed of a composition the crystalline polyolefin of which is a copolymer of ethylene and propylene in which the propylene predominates.

17. Dyed manufactured articles according to claim 12, the basic polyamide of which is a product obtained by reacting N-(2-aminoethyl) piperazine with methyl acrylate.

18. Dyeable compositions according to claim 7, in which the crystalline polyolefin is polypropylene consisting essentially of isotactic macromolecules.

References Cited

UNITED STATES PATENTS

| | | | |
|---|---|---|---|
| 3,530,201 | 9/1970 | Schwarcz | 260—857 |
| 3,494,980 | 2/1970 | Lees et al. | 260—857 |
| 3,312,755 | 4/1967 | Cappuccio et al. | 260—859 |

MURRAY TILLMAN, Primary Examiner

C. J. SECCURO, Assistant Examiner

U.S. Cl. X.R.

8—31, 168; 260—896, 897 R, 897 B; 264—210 F

UNITED STATES PATENT OFFICE
CERTIFICATE OF CORRECTION

Patent No. 3,741,930                    Dated June 26, 1973

Inventor(s) Alberto Bonvicini et al

It is certified that error appears in the above-identified patent and that said Letters Patent are hereby corrected as shown below:

Col. 9, line 5, "235°C" should read - - -230°C- - -.

Col. 10, line 55, "28 g" should read - - - 228 g - - -;

line 59, "9.4%" should read - - -9.0%- - -.

Signed and sealed this 5th day of November 1974.

(SEAL)
Attes:

McCOY M. GIBSON JR.                         C. MARSHALL DANN
Attesting Officer                           Commissioner of Patents